(12) United States Patent
Lalonge et al.

(10) Patent No.: US 9,071,110 B2
(45) Date of Patent: Jun. 30, 2015

(54) ABNORMALITY DETECTION METHOD AND APPARATUS

(71) Applicant: Energie H.T. International Inc., Boucherville (CA)

(72) Inventors: Patrick Lalonge, McMasterville (CA); Philip Neron, Beloeil (CA)

(73) Assignee: EHT INTERNATIONAL INC., Boucherville, Quebec (CA)

( * ) Notice: Subject to any disclaimer, the term of this patent is extended or adjusted under 35 U.S.C. 154(b) by 262 days.

(21) Appl. No.: 13/652,736

(22) Filed: Oct. 16, 2012

(65) Prior Publication Data

US 2014/0103849 A1    Apr. 17, 2014

(51) Int. Cl.
*G01R 31/02* (2006.01)
*H02H 7/08* (2006.01)
*H02K 11/00* (2006.01)
*H02P 1/00* (2006.01)
*G05B 13/00* (2006.01)

(52) U.S. Cl.
CPC .................................. *H02K 11/001* (2013.01)

(58) Field of Classification Search
USPC ......................................................... 318/490
See application file for complete search history.

(56) References Cited

U.S. PATENT DOCUMENTS

| | | | |
|---|---|---|---|
| 4,422,040 A | 12/1983 | Raider et al. | |
| 4,904,911 A | 2/1990 | Toyoda et al. | |
| 4,965,513 A | 10/1990 | Haynes et al. | |
| 5,209,110 A | 5/1993 | Sano et al. | |
| 5,239,874 A | 8/1993 | Hale | |
| 5,563,790 A | 10/1996 | Wada et al. | |
| 5,754,450 A | 5/1998 | Solomon et al. | |
| 5,917,428 A * | 6/1999 | Discenzo et al. | 340/870.01 |
| 6,112,156 A | 8/2000 | Kang | |
| 6,456,946 B1 | 9/2002 | O'Gorman | |
| 6,776,584 B2 | 8/2004 | Sabini et al. | |
| 6,785,604 B2 | 8/2004 | Jacobson | |
| 6,904,813 B2 | 6/2005 | Zaremb et al. | |
| 6,932,675 B1 | 8/2005 | Bremer et al. | |
| 6,933,693 B2 | 8/2005 | Schuchmann | |

(Continued)

FOREIGN PATENT DOCUMENTS

| | | |
|---|---|---|
| DK | 200200678 | 11/2003 |
| GB | 2374147 | 10/2002 |

OTHER PUBLICATIONS

International Search Report dated Feb. 6, 2014 issued by the Canadian Intellectual Property Office in the corresponding International Patent Application PCT/CA2013/000893.

*Primary Examiner* — Paul Ip
*Assistant Examiner* — Devon Joseph
(74) *Attorney, Agent, or Firm* — Norton Rose Fulbright Canada LLP (57) ABSTRACT

There is provided a system and method for detecting an abnormal operation of a motor controlling an operating parameter of a machine. Both a torque of the motor and the operating parameter are monitored. A memory stores a plurality of predetermined torque values indicative of a normal operation of the motor. A plurality of operating parameter values are also stored in the memory with each operating parameter value having a corresponding predetermined torque value associated therewith. The predetermined torque value corresponding to the monitored operating parameter is retrieved from the memory and compared to the monitored torque value to detect an abnormal operation of the motor.

20 Claims, 6 Drawing Sheets

(56) References Cited

U.S. PATENT DOCUMENTS

| | | |
|---|---|---|
| 7,116,077 B2 | 10/2006 | Raftari et al. |
| 7,254,514 B2 | 8/2007 | House et al. |
| 7,339,295 B2 * | 3/2008 | Knauff .................... 310/68 C |
| 7,385,365 B2 | 6/2008 | Feick |
| 7,392,158 B2 | 6/2008 | Hikawa et al. |
| 7,835,887 B2 | 11/2010 | Abbata et al. |
| 7,949,483 B2 * | 5/2011 | Discenzo et al. ............... 702/60 |
| 8,401,822 B2 * | 3/2013 | Dimino et al. ................ 702/183 |
| 8,749,927 B2 * | 6/2014 | Beifus et al. ..................... 361/22 |
| 2003/0193310 A1 | 10/2003 | Raftari et al. |
| 2007/0177983 A1 * | 8/2007 | Levan et al. .................... 417/19 |
| 2008/0048603 A1 * | 2/2008 | Discenzo ...................... 318/561 |
| 2008/0251071 A1 | 10/2008 | Armitstead et al. |
| 2009/0200978 A1 | 8/2009 | Kato et al. |

* cited by examiner

ABNORMALITY DETECTION METHOD AND APPARATUS

TECHNICAL FIELD the application relates generally to a method and apparatus for detecting an abnormal operation of a motor.

BACKGROUND OF THE ART

Motors may be used to control operating parameters of a variety of apparatuses, machines, and systems. A motor may indeed be used to control the position of a mechanical element of a machine or adjust a gas pressure within the machine. In order to detect a potential malfunction of the motor, the operating parameter is typically monitored using a suitable sensing device. For instance, a motor may be used for driving a gas compressor and a pressure sensor may monitor the pressure of the compressed gas. If the monitored pressure differs from a desired pressure, one may conclude to a malfunction of the gas compressor.

However, while efficient in detecting abnormal operation, such detection systems usually cannot predict problems related to wear and tear of the machines the motor is coupled to. In addition, such systems typically cannot determine if the problem is related to the motor being monitored or to another component of the system.

There is therefore a need for an improved method and apparatus for detecting an abnormal operation of a motor.

SUMMARY

In accordance with a first broad aspect, there is provided a system for detecting an abnormal operation of a motor repeatedly executing a task for controlling at least one machine parameter of a machine, the system comprising a memory having stored therein a plurality of values of the at least one machine parameter and a plurality of values of a motor parameter, the plurality of values of the at least one machine parameter and the plurality of values of the motor parameter obtained upon past execution of the task by the motor and each value of the motor parameter associated with a corresponding one of the plurality of values of the at least one machine parameter and indicative of a normal operation of the motor at the corresponding value of the at least one machine parameter; a processor; and at least one application stored in the memory and executable by the processor for receiving, upon the motor currently executing the task, a measurement of the motor parameter and a measurement of the at least one machine parameter, identifying in the memory a selected one of the plurality of values of the at least one machine parameter corresponding to the received measurement of the at least one machine parameter, retrieving from the memory a value of the motor parameter associated with the selected value of the at least one machine parameter, and comparing the retrieved value of the motor parameter to the received measurement of the motor parameter to detect the abnormal operation of the motor.

In accordance with a second broad aspect, there is provided a computer-implemented method for detecting an abnormal operation of a motor repeatedly executing a task for controlling at least one machine parameter of a machine, the method comprising, upon the motor currently executing the task, receiving a measurement of a motor parameter and receiving a measurement of the at least one machine parameter; identifying in a memory having stored therein a plurality of values of the at least one machine parameter a selected one of the plurality of values of the at least one machine parameter corresponding to the received measurement of the at least one machine parameter, the memory having further stored therein a plurality of values of the motor parameter each associated with a corresponding one of the plurality of values of the at least one machine parameter and indicative of a normal operation of the motor for the corresponding value of the at least one machine parameter, the plurality of values of the at least one machine parameter and the plurality of values of the motor parameter obtained upon past execution of the task by the motor; retrieving from the memory a value of the motor parameter associated with the selected value of the at least one machine parameter; and comparing the retrieved value of the motor parameter to the received measurement of the motor parameter to detect the abnormal operation of the motor.

In accordance with a third broad aspect, there is provided a computer readable medium having stored thereon program code executable by a processor for detecting an abnormal operation of a motor repeatedly executing a task for controlling at least one machine parameter of a machine, the program code executable for, upon the motor currently executing the task, receiving a measurement of a motor parameter and receiving a measurement of the at least one machine parameter; identifying in a memory having stored therein a plurality of values of the at least one machine parameter a selected one of the plurality of values of the at least one machine parameter corresponding to the received measurement of the at least one machine parameter, the memory having further stored therein a plurality of values of the motor parameter each associated with a corresponding one of the plurality of values of the at least one machine parameter and indicative of a normal operation of the motor for the corresponding value of the at least one machine parameter, the plurality of values of the at least one machine parameter and the plurality of values of the motor parameter obtained upon past execution of the task by the motor; retrieving from the memory a value of the motor parameter associated with the selected value of the at least one machine parameter; and comparing the retrieved value of the motor parameter to the received measurement of the motor parameter to detect the abnormal operation of the motor.

DESCRIPTION OF THE DRAWINGS

Reference is now made to the accompanying figures in which.

DETAILED DESCRIPTION

Figure 1:
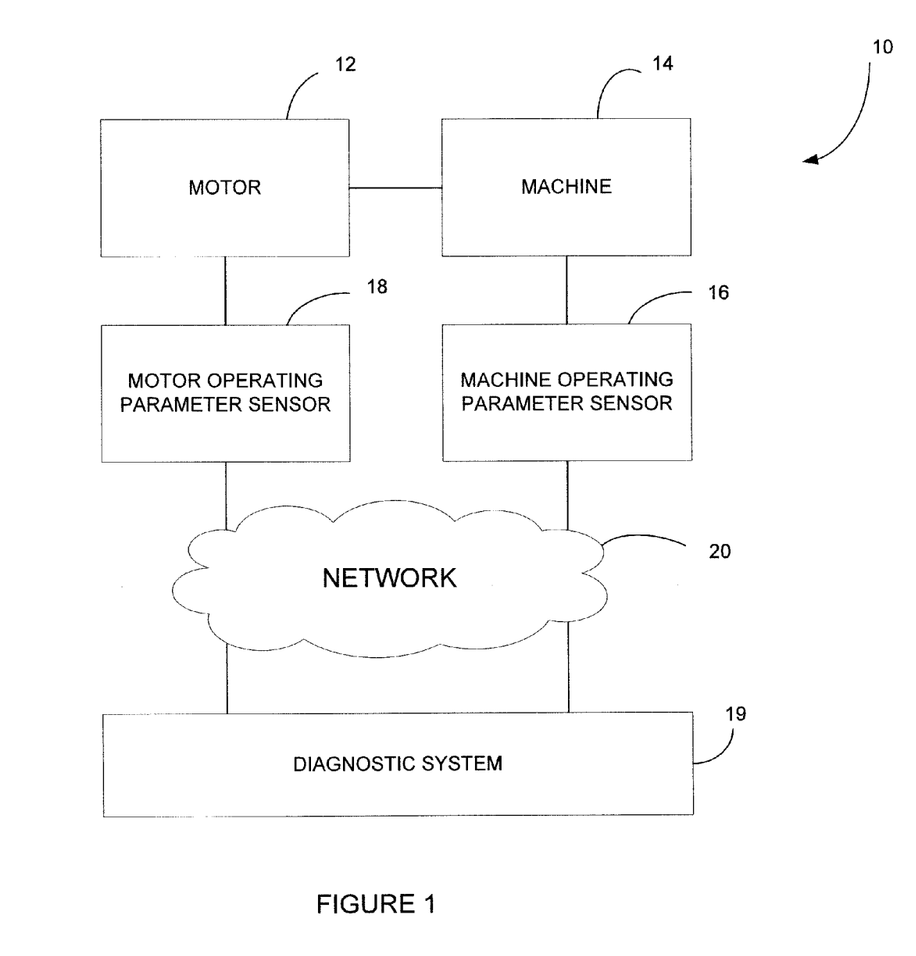
FIG. 1 is a schematic diagram of a system for detecting an abnormal operation of a motor, in accordance with an illustrative embodiment.

Referring to FIG. 1, a system 10 for detecting an abnormal operation of a motor 12 will now be described. Abnormal operation of the motor 12 may, for example, result from a low output torque of the motor 12 or a mechanical or electrical failure of the motor 12. Mechanical failures may be due to inadequate lubrication, vibration, misalignment, or bearing failure, while electrical failures may be due to an electrical overload or a low insulation resistance. The motor 12 illustratively executes a repetitive task that is to be executed in a substantially identical manner from one operation of the motor 12 to the next. The motor 12 thus illustratively performs the same task continually and abnormal operation of the motor 12 can be detected if at any given time the task is not performed in the manner in which it was performed previously. For example, the motor 12 may be used to repeatedly rotate a mechanical part or element at a predetermined angle and/or position. If at a given time, it is determined that the motor 12 no longer rotates the mechanical part at the predetermined angle and/or position, abnormal operation of the motor 12 can be detected.

In particular, by executing the repetitive task, the motor 12 may be used to control an operating parameter of a machine 14. For example, an electric or internal combustion motor as in 12 may be used to control the pressure of gas compressed by a gas compressor (not shown). In this case, the motor 12 may drive a shaft of the gas compressor, the shaft in turn driving a plurality of pistons whose action compresses gas injected into the gas compressor. Although the motor 12 is described herein as being coupled to a gas compressor, it should be understood that a plurality of other machines or systems, such as a centrifugal pump operated by means of the motor 12, an electrically powered vehicle, a valve system, and the like, may apply. As such, a variety of operating parameters other than a gas pressure may be controlled by the motor 12. For example, the operating parameter of the machine 14 may comprise, but is not limited to, a position or an angle of a mechanical element, such as an arm actuated by the motor 12. Alternatively, the operating parameter may be a temperature of the machine 14 or an electrical power produced by the machine 14. It should also be understood that the motor 12 may control more than one operating parameter of a given machine 14 or control operating parameters of a plurality of machines as in 14.

A first sensor 16 may be used to monitor the machine operating parameter controlled by the motor 12. In the case where the motor 12 drives a gas compressor, the sensor 16 may be a pressure sensor 16 measuring the pressure of the compressed gas. It should be understood that other types of sensors, such as position sensors, temperature sensors, flow sensors, tilt sensors, and the like, may be used if machine operating parameters other than pressure are monitored. It should also be understood that since the motor 12 may be used to control more than one operating parameter of the machine 14, the system 10 may comprise a plurality of sensors as in 16.

A second sensor 18 may further be used to monitor an operating parameter of the motor 12. For example, the torque of the motor 12 may be measured by a torque sensor. It should be understood that motor operating parameters other than the torque, for example a revolution speed of the motor 12, a noise of the motor 12, or a current flowing through the motor 12, may also be monitored. It will also be apparent to a person skilled in the art that the torque of the motor 12 may be obtained by measuring a current flowing through the motor 12 rather than on the basis of a reading from the torque sensor 18.

Figure 2:
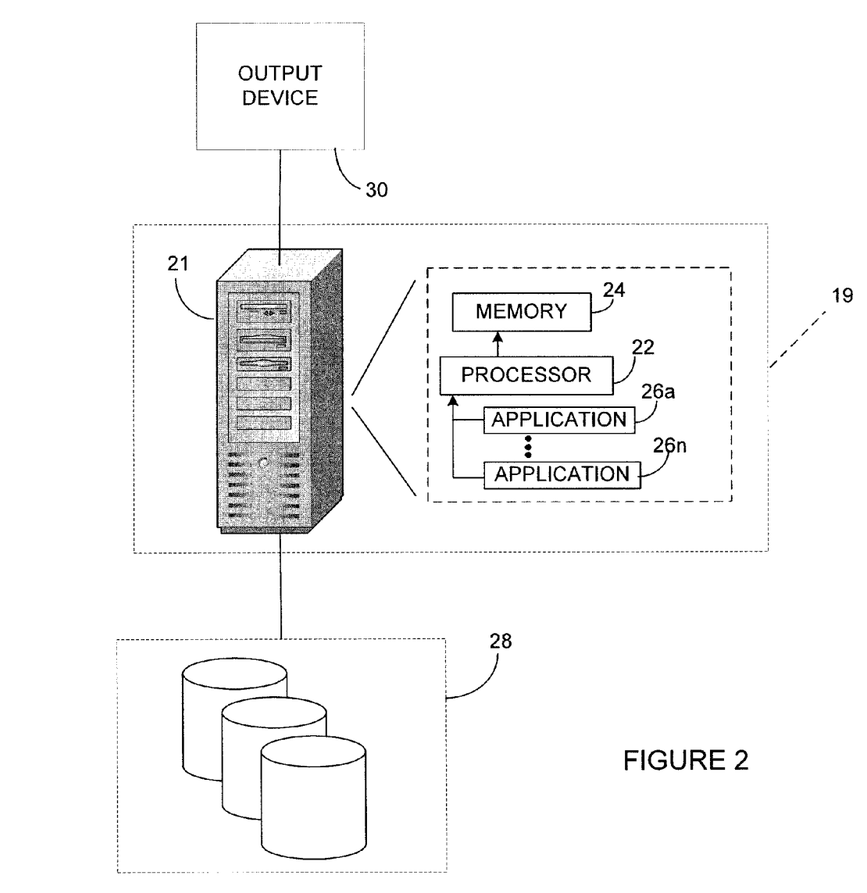
FIG. 2 is a schematic diagram of the diagnostic system of FIG. 1.

Referring to FIG. 2 in addition to FIG. 1, a diagnostic system 19 may be accessible over a network 20, such as a Local Area Network (LAN), the Internet, or others known to those skilled in the art. The diagnostic system 19 is illustratively coupled to the machine operating parameter sensor 16 and to the motor operating parameter sensor 18 to detect an abnormal operation of the motor 12. For this purpose, the diagnostic system 19 may comprise one or more server(s) 21. For example, a series of servers corresponding to a web server, an application server, and a database server may be used. These servers are all represented by server 21 in FIG. 2. The server 21 may be accessed by a user using a device (not shown), such as a personal computer, a personal digital assistant, a smart phone, or the like, which is configured to communicate over the network 20.

The server 21 may comprise, amongst other things, a processor 22 coupled to a memory 24 and having a plurality of applications $26a, \ldots, 26n$ running thereon. The processor 22 may access the memory 24 to retrieve data. The processor 22 may be any device that can perform operations on data. Examples are a central processing unit (CPU), a microprocessor, and a front-end processor. The applications $26a, \ldots, 26n$ are coupled to the processor 22 and configured to perform various tasks as explained below in more detail. It should be understood that while the applications $26a, \ldots, 26n$ presented herein are illustrated and described as separate entities, they may be combined or separated in a variety of ways.

The memory 24 accessible by the processor 22 may receive and store data. The memory 24 may be a main memory, such as a high speed Random Access Memory (RAM), or an auxiliary storage unit, such as a hard disk, a floppy disk, or a magnetic tape drive. The memory 24 may be any other type of memory, such as a Read-Only Memory (ROM), or optical storage media such as a videodisc and a compact disc.

One or more databases 28 may be integrated directly into the memory 24 or may be provided separately therefrom and remotely from the server 21 (as illustrated). In the case of a remote access to the databases 28, access may occur via any type of network 20, as indicated above. The databases 28 described herein may be provided as collections of data or information organized for rapid search and retrieval by a computer. The databases 28 may be structured to facilitate storage, retrieval, modification, and deletion of data in conjunction with various data-processing operations. The databases 28 may consist of a file or sets of files that can be broken down into records, each of which consists of one or more fields. Database information may be retrieved through queries using keywords and sorting commands, in order to rapidly search, rearrange, group, and select the field. The databases 28 may be any organization of data on a data storage medium, such as one or more servers.

Figure 3:
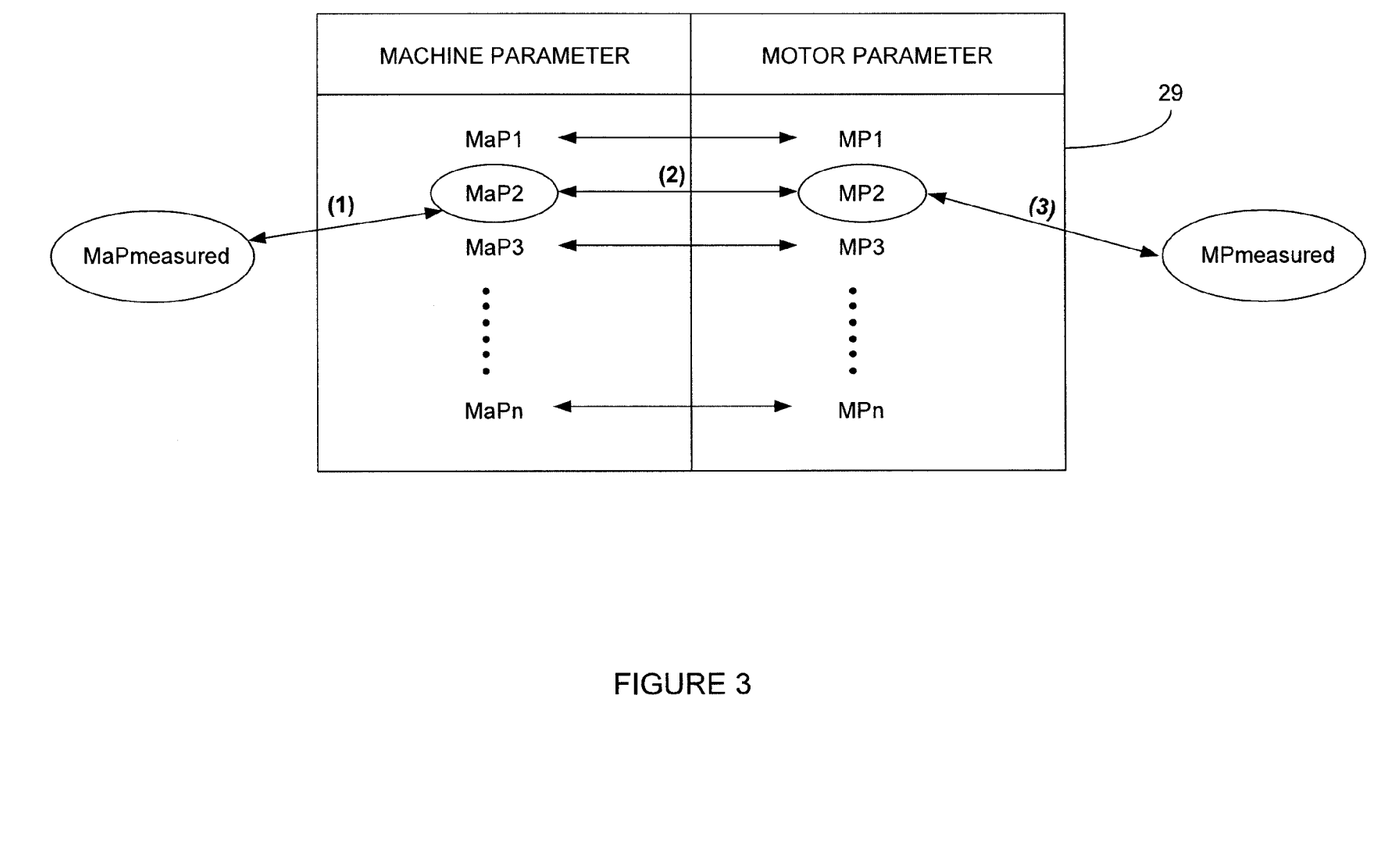
FIG. 3 is a schematic diagram of a lookup table and a lookup process, in accordance with an illustrative embodiment.

Referring to FIG. 3 in addition to FIG. 2, at least one of the databases 28 and/or the memory 24 illustratively stores a plurality of predetermined motor operating parameter values MP1, MP2, MP3, . . . , MPn each corresponding to a given value MaP1, MaP2, MaP3, . . . , or MaPn of the machine operating parameter. The stored data may be in a lookup table format 29 or other suitable data structure. For example, the database 28 may comprise a list of a plurality of gas pressure levels, each pressure level associated with a corresponding predetermined motor torque value from a list of predetermined torque values stored in the database 28. The predetermined motor operating parameter values MP1, MP2, MP3, . . . , MPn, e.g. the predetermined torque values, may be acquired during tests effected with the motor 12 placed under normal operating conditions. The normal operating conditions are illustratively similar to the conditions at which the motor 12 may be expected to operate to control the operating parameter of the machine 14. For example, torque values may be measured under baseline running conditions for different pressure values of the gas compressed by the motor 12. The measured baseline torque values may then indicate each value of the motor torque, which should correspond to a corresponding pressure when the motor 12 is operating normally. The measured torque values may serve as baseline data to which future measurements may be compared. It will be appreciated that the baseline values may be particular to the model of the motor 12 and/or of the machine 14.

The processor 22 illustratively periodically receives measurements as in MaPmeasured of the machine operating parameter, e.g. the gas pressure, monitored by the machine operating parameter sensor 16 and measurements as in MPmeasured of the motor operating parameter, e.g. the torque, monitored by the motor operating parameter sensor 18. According to the received readings, the processor 22 may then determine whether the motor 12 is functioning normally. This may be achieved without suspending operation of the motor 12. In particular, and as discussed further below, the processor 22 may compare the monitored value MPmeasured of the motor operating parameter to a predetermined value MP2 of the motor operating parameter associated with the reading of the machine operating parameter MaPmeasured in order to determine whether the motor 12 is functioning properly. The result of such a comparison may then be presented to a user on an output device 30, such as a screen, a speaker, or the like. For example, an audible alarm may be generated on the output device 30 if abnormal operation of the motor 12 has been detected. A visual indicator, such as flag or blinking light, may also be displayed on the output device 30.

Figure 4:
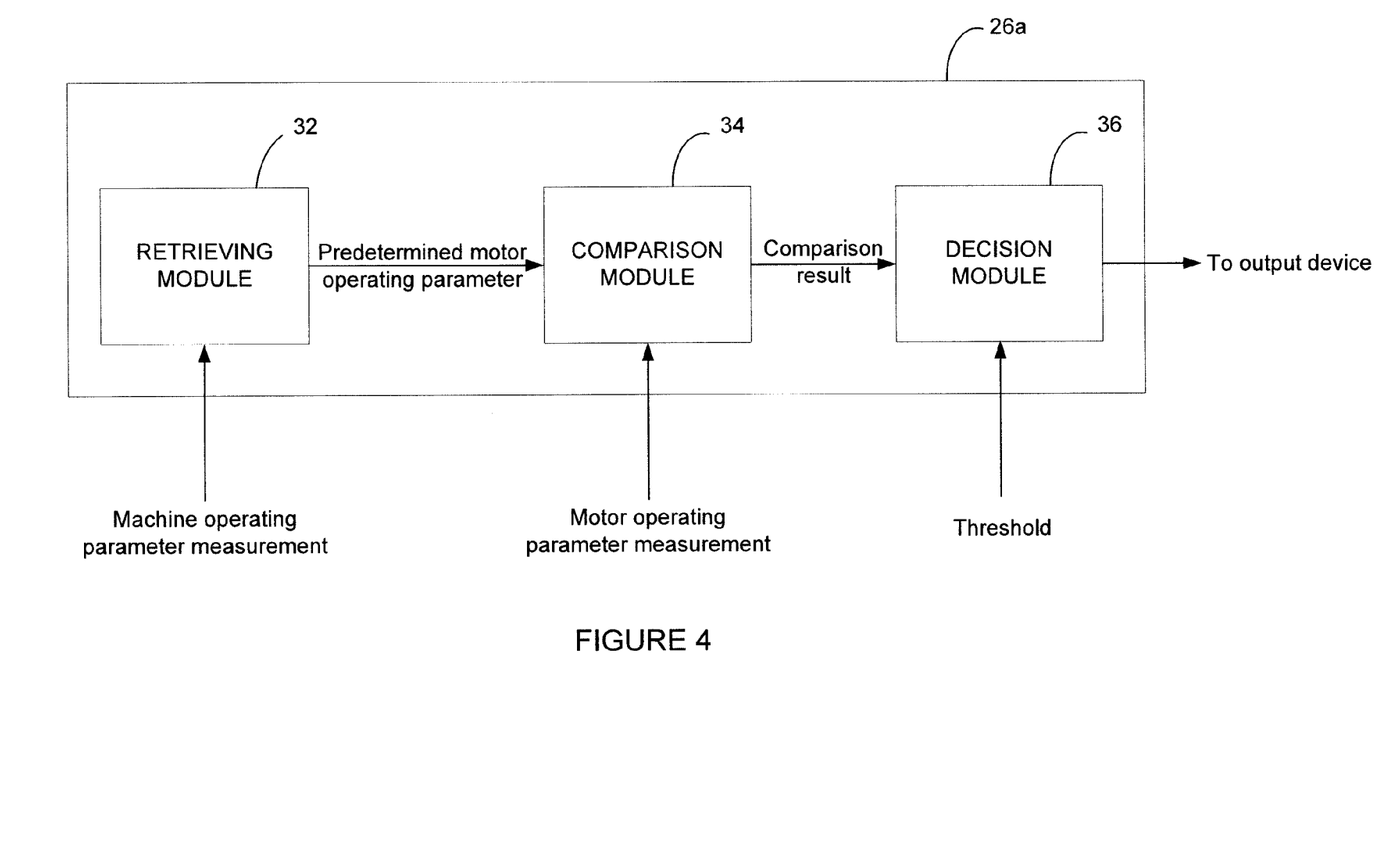
FIG. 4 is a schematic diagram of an exemplary application running on the processor of FIG. 2.

FIG. 4 is an exemplary embodiment of an application 26a running on the processor 22. The application 26a may comprise a retrieving module 32, a comparison module 34, and a decision module 36. The retrieving module 32 illustratively receives the measurement MaPmeasured of the machine operating parameter from the machine operating parameter sensor 16. The retrieving module 32 may then query the database 28 to retrieve the predetermined value, e.g. MP2, of the motor operating parameter corresponding to the received measurement MaPmeasurement of the machine operating parameter. Retrieval of the predetermined value may be effected by table lookup. For example, the retrieving module 32 may search within the values MaP1, MaP2, MaP3, . . . , MaPn of the machine operating parameter stored in the database 28 the value, e.g. MaP2, which is closest to the received measurement MaPmeasured of the machine operating parameter. The retrieving module 32 may then cross-reference the identified stored value MaP2 of the machine operating parameter to the stored value of the corresponding value MP2 of the motor operating parameter and retrieve this corresponding value MP2 from the database 28.

The retrieving module 32 may then transmit the predetermined value MP2 of the motor operating parameter to the comparison module 34, which illustratively further receives the measurement MPmeasured of the motor operating parameter from the torque sensor 18. The comparison module 34 may then compare the predetermined value MP2 to the received measured value MPmeasured. In particular, the comparison module 34 may determine whether and to what extent, e.g. by what amount or percentage, the predetermined value MP2 of the motor operating parameter differs from the received measurement MPmeasured of the motor operating parameter. For this purpose, the comparison module 34 may compute a difference between the monitored motor operating parameter MPmeasured and the predetermined motor operating parameter MP2. The comparison module 34 may then send the difference to the decision module 36. It should be understood that, in order to compare the two values, the comparison module 34 may alternatively compute a ratio of the monitored motor operating parameter MPmeasured and the predetermined motor operating parameter MP2.

Upon receiving the result of the comparison from the comparison module 34, the decision module 36 may compare the received result to a threshold amount or percentage retrieved from the database 28. The threshold may be determined according to the motor specifications provided by the manufacturer and may depend on the model of the motor 12. If the difference is above the threshold, an abnormal operation of the motor 12 may be detected. For example, if, for a given measured pressure, the measured torque is superior to the predetermined torque by an amount or percentage exceeding the threshold, the decision module 36 may conclude to wear and tear of the motor 12. Otherwise, if the difference between the monitored torque and the predetermined torque is below or equal to the threshold, the decision module 36 may conclude that the motor 12 is operating normally. The diagnostic effected by the decision module 36 may then be presented to the user on the output device 30.

Although the comparison module 34 and the decision module 36 have been illustrated as separate components, it will be appreciated that they may be merged into a single component. It will also be appreciated that the monitoring process effected by the diagnostic system 19 may be performed over a long period of time. The diagnostic data produced by the decision module 36 may therefore be periodically stored in the database 28 and compared over time to monitor the health of the motor 12.

Figure 5A:
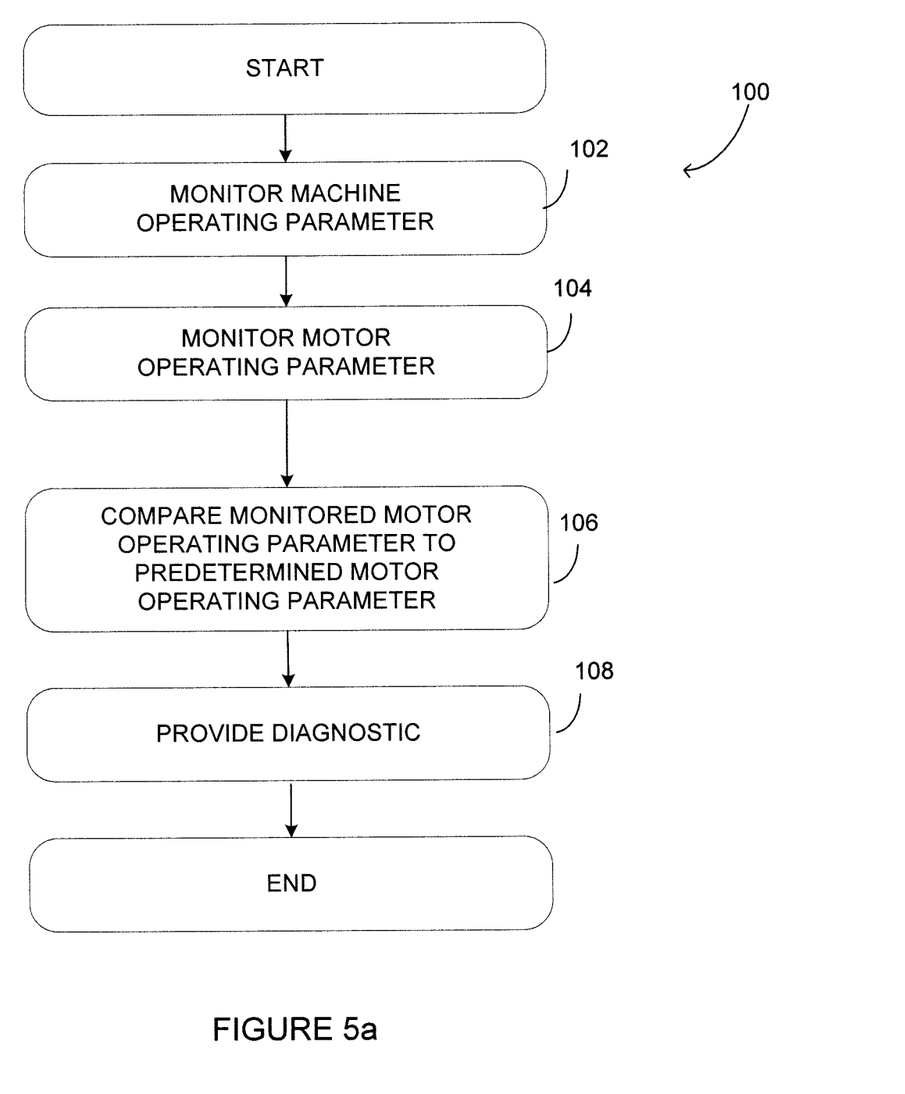
FIG. 5a is a flowchart of a method for detecting an abnormal operation of a motor, in accordance with an illustrative embodiment.

Referring to FIG. 5a, a method 100 for detecting an abnormal operation of a motor will now be described. The method 100 illustratively comprises at step 102 monitoring an operating parameter of the machine 14 and at step 104 monitoring an operating parameter, e.g. a torque, of the motor 12 coupled to the machine 14. The method 100 further comprises at step 106 comparing the monitored motor operating parameter to a predetermined motor operating parameter and providing a diagnostic to a user at step 108. The diagnostic may be provided at step 108 via the output device 30, as discussed above.

Figure 5B:
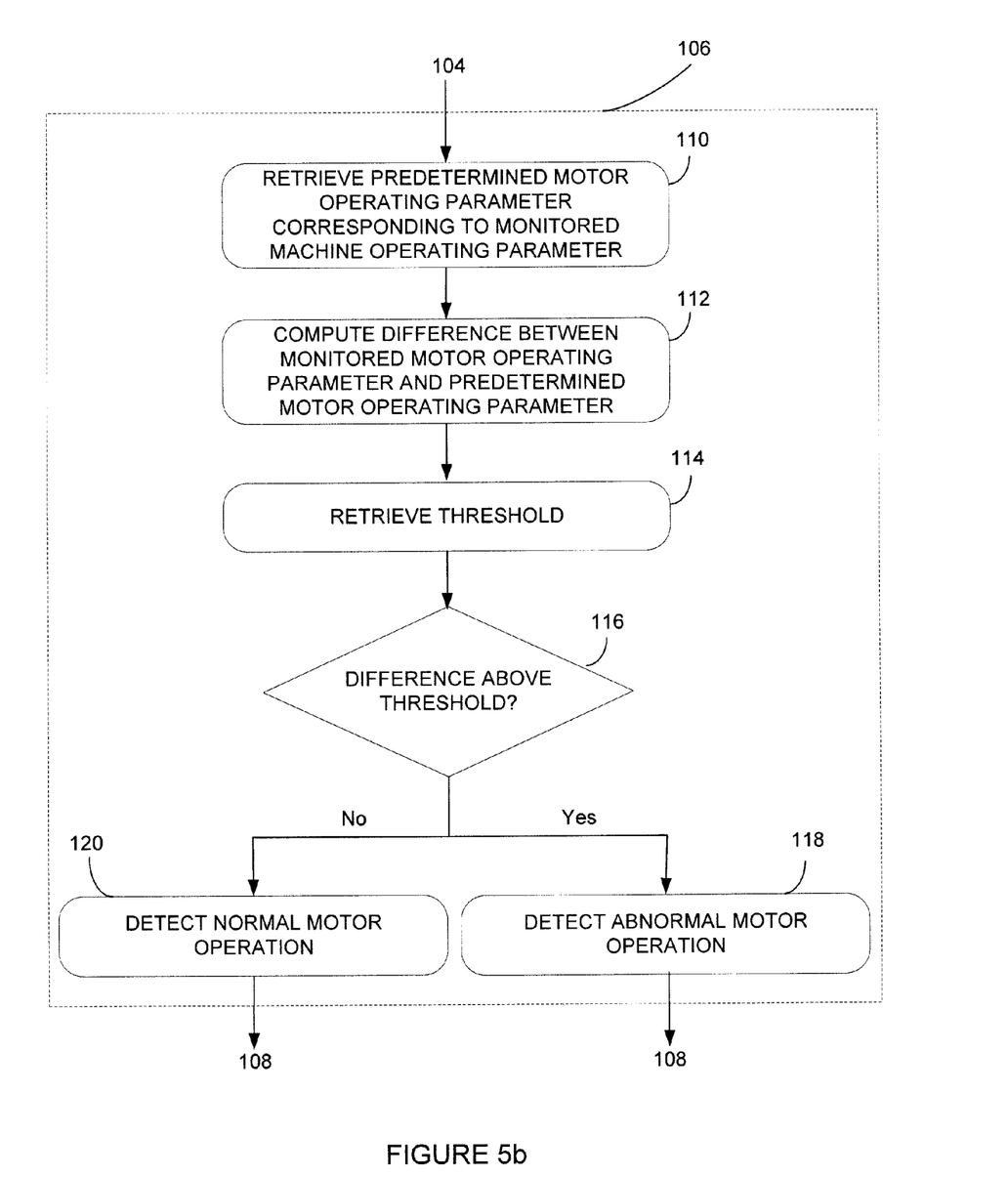
FIG. 5b is a flowchart of the step of FIG. 5a of comparing a monitored torque to a predetermined torque, in accordance with an illustrative embodiment.

Referring to FIG. 5b, the step 106 of comparing the monitored motor operating parameter to the predetermined motor operating parameter may comprise at step 110 retrieving a predetermined value of the motor operating parameter corresponding the monitored machine operating parameter. The predetermined motor operating parameter is illustratively indicative of a normal operation of the motor 12. The retrieval may be effected by querying the database 28, as discussed above. Once the predetermined value of the motor operating parameter has been retrieved, a difference between the monitored motor operating parameter and the predetermined motor operating parameter may be computed at step 112. It should be understood that a ratio of the two values may also be computed, as discussed above. A predetermined threshold may then be retrieved from the database 28 at step 114 and the difference may be compared to the threshold. In particular, it may be determined at step 116 whether the difference is above the threshold. If this is the case, an abnormal operation of the motor 12 is detected at step 118. Otherwise, it is determined at step 120 that the motor 12 is operating normally.

The above description is meant to be exemplary only, and one skilled in the art will recognize that changes may be made to the embodiments described without departing from the scope of the invention disclosed. Modifications which fall within the scope of the present invention will be apparent to those skilled in the art, in light of a review of this disclosure, and such modifications are intended to fall within the appended claims.

The invention claimed is:

1. A system for detecting an abnormal operation of a motor repeatedly executing a task for controlling at least one machine parameter of a machine, the system comprising:
   a memory having stored therein a plurality of associated values of a machine parameter and a motor parameter, the associated values of the machine parameter and the motor parameter obtained upon past execution of the task by the motor and indicative of a normal operation of the motor;
   a processor; and
   at least one application stored in the memory and executable by the processor for:
      receiving, upon the motor currently executing the task, a measurement of a motor operating parameter and a measurement of a machine operating parameter,
      identifying in the memory at least one machine parameter value corresponding to the received measurement of the machine operating parameter,
      retrieving from the memory a motor parameter value associated with the at least one machine parameter value, and
      comparing the retrieved motor parameter value to the received measurement of the motor operating parameter to detect the abnormal operation of the motor.

2. The system of claim 1, wherein the at least one application is executable by the processor for computing a difference between the retrieved motor parameter value and the received measurement of the motor operating parameter and comparing the difference to a predetermined threshold to detect the abnormal operation of the motor.

3. The system of claim 1, wherein the at least one application is executable by the processor for detecting the abnormal operation of the motor if the difference is above the threshold and for detecting the normal operation of the motor otherwise.

4. The system of claim 1, wherein the machine operating parameter is selected from the group consisting of a pressure of a gas compressed by the machine, a temperature of the machine, an electrical power produced by the machine, a position of a mechanical member of the machine actuated by the motor, and an angle of the mechanical member.

5. The system of claim 1, wherein receiving a measurement of the motor operating parameter comprises receiving a measurement of a torque of the motor.

6. The system of claim 5, wherein receiving a measurement of the torque of a motor comprises receiving the measurement from a torque sensor coupled to the motor.

7. The system of claim 5, wherein receiving a measurement of the torque of the motor comprises determining the measurement from a current flowing through the motor.

8. The system of claim 5, wherein receiving a measurement of the machine operating parameter comprises receiving the measurement of a pressure of a gas compressed by the machine.

9. The system of claim 5, wherein receiving a measurement of the machine operating parameter comprises receiving from a position sensor a position of a mechanical member of the machine actuated by the motor.

10. The system of claim 1, wherein the at least one application is executable by the processor for identifying in the memory the at least one machine parameter value by searching for a value closest to the received measurement of the machine operating parameter.

11. A computer-implemented method for detecting an abnormal operation of a motor repeatedly executing a task for controlling at least one machine parameter of a machine, the method comprising:
   upon the motor currently executing the task, receiving a measurement of a motor operating parameter and receiving a measurement of a machine operating parameter;
   identifying, in a memory having stored therein a plurality of associated values of a machine parameter and a motor parameter obtained upon past execution of the task by the motor and indicative of a normal operation of the motor, at least one machine parameter value corresponding to the received measurement of the machine operating parameter;
   retrieving from the memory a motor parameter value associated with the at least one machine parameter value, and
   comparing the retrieved motor parameter value to the received measurement of the motor operating parameter to detect the abnormal operation of the motor.

12. The method of claim 11, wherein comparing the retrieved motor parameter value to the received measurement of the motor operating parameter comprises computing a difference between the retrieved motor parameter and the received measurement of the motor operating parameter and comparing the difference to a predetermined threshold to detect the abnormal operation of the motor.

13. The method of claim 12, further comprising detecting the abnormal operation of the motor if the difference is above the threshold and detecting the normal operation of the motor otherwise.

14. The method of claim 11, wherein the machine operating parameter is selected from the group consisting of a pressure of a gas compressed by the machine, a temperature of the machine, an electrical power produced by the machine, a position of a mechanical member of the machine actuated by the motor, and an angle of the mechanical member.

15. The method of claim 11, wherein receiving a measurement of a motor operating parameter comprises receiving a measurement of a torque of the motor.

16. The method of claim 15, wherein receiving a measurement of the torque of the motor comprises receiving the measurement from one of a torque sensor coupled to the motor and a measurement of a current flowing through the motor.

17. The method of claim 15, wherein receiving a measurement of the machine operating parameter comprises receiving the measurement of a pressure of a gas compressed by the machine.

18. The method of claim 15, wherein receiving a measurement of the machine operating parameter comprises receiving from a position sensor a position of a mechanical member of the machine actuated by the motor.

19. The method of claim 11, wherein identifying in the memory the at least one machine parameter value comprises searching for a value closest to the received measurement of the at least one machine operating parameter.

20. A computer readable medium having stored thereon program code executable by a processor for detecting an abnormal operation of a motor repeatedly executing a task for controlling at least one machine parameter of a machine, the program code executable for:
   upon the motor currently executing the task, receiving a measurement of a motor operating parameter and receiving a measurement of a machine operating parameter;

identifying in a memory having stored therein a plurality of associated values of a machine parameter and a motor parameter obtained upon past execution of the task by the motor and indicative of a normal operation of the motor, at least one machine parameter value corresponding to the received measurement of the machine operating parameter;

retrieving from the memory a motor parameter value associated with the at least one machine parameter value, and comparing the retrieved motor parameter value to the received measurement of the motor operating parameter to detect the abnormal operation of the motor.

* * * * *